United States Patent [19]
Okada et al.

[11] 3,885,481
[45] May 27, 1975

[54] METHOD TO PRODUCE AN OVAL PRODUCT HAVING OVAL CIRCUMFERENCE BY CUTTING PROCESS

[76] Inventors: Jujiro Okada, No. 69, Chodo-1-Chome; Isamu Satoo, No. 11/17, Fukae-Minami-2-chome, Higashinari-ku, both of Osaka, Japan

[22] Filed: Nov. 30, 1973

[21] Appl. No.: 420,461

[52] U.S. Cl.................... 82/1 C; 82/18 R; 82/14 R
[51] Int. Cl.......................... B23b 3/00; B23b 3/28
[58] Field of Search............. 82/1.3, 1.4, 14, 18, 19

[56] References Cited
UNITED STATES PATENTS

| | | | |
|---|---|---|---|
| 1,625,650 | 4/1927 | Gottmanns............................ | 82/1.4 |
| 2,004,283 | 6/1935 | Hurt.................................... | 82/19 X |
| 2,082,212 | 6/1937 | Nickles................................ | 82/19 X |
| 2,121,934 | 6/1938 | Snader et al......................... | 82/19 |
| 2,191,898 | 2/1940 | Nelson................................ | 82/19 X |
| 2,720,806 | 10/1955 | Stewart............................... | 82/18 X |
| 3,212,370 | 10/1965 | Spriggs et al. ...................... | 82/14 |

OTHER PUBLICATIONS
IBM Technical Disclosure Bulletin–Variable Cam Cutter–by T. W. Denne – Vol. 13, No. 2, July 1970.

Primary Examiner—Harrison L. Hinson
Attorney, Agent, or Firm—Wenderoth, Lind & Ponack

[57] ABSTRACT

A method to produce an oval product having an oval circumference by a cutting process which is characterized by fixing a cylindrical body to one end of a rotative main shaft at a prescribed inclined angle against the main shaft in such way that the section of a plane, which falls at right angles to the axial line of the main shaft makes an oval shape similar to the circumference of a required oval product, and by providing a tracing equipment for biasing the circumference of the cylindrical body situated along the circumference of the section which corresponds to a position where the center of said oval section agrees with the axial line of the main shaft. Then material fixed to the main shaft is cut into a master cam having an oval circumference. Using this master cam as a basis, the desired oval product is cut by using of a tracing apparatus.

1 Claim, 3 Drawing Figures

METHOD TO PRODUCE AN OVAL PRODUCT HAVING OVAL CIRCUMFERENCE BY CUTTING PROCESS

The present invention is related to a method of producing a precise oval easily, not by using any specific oval die plate, but by using an ordinary cylindrical body as a basis when cutting out an oval product having an oval circumference through the medium of a tracing apparatus.

Parts having oval circumference such as oval screws, oval shafts, oval pistions, etc. demonstrate high efficiency when they engage with oval holes of other parts, because they contact the entire oval circumference of those holes. This differs from the case of parts having multi-angular circumference. However, it has been considered difficult to finish the circumference of a punch or a dice for mass production of those oval parts into a precise oval.

The cutting process to obtain an oval circumference is usually done by trace cutting. However, in order to use a tracing lathe, that is to say, to carry out cutting while guiding a cutting tool along a die plate and operating both the tool and an object to be processed simultaneously, it is necessary to make the die plate very precisely. Heretofore the die plate has been made by such a time-and-labour consuming method as shaping it roughly by hand and then rectifying it by enlarging it by means of projection.

The present invention is to produce a right oval plate, which is a die plate for cutting out an oval product and which is usually called a master cam, direct from the section of a cylindrical body without using the conventional projection method. It is based on a premise that a right oval is a section produced when a right cylindrical body is cut obliquely.

Other objects and advantages of the invention will become apparent from the following detailed description taken in connection with the accompanying drawings, in which.

Figure 1:
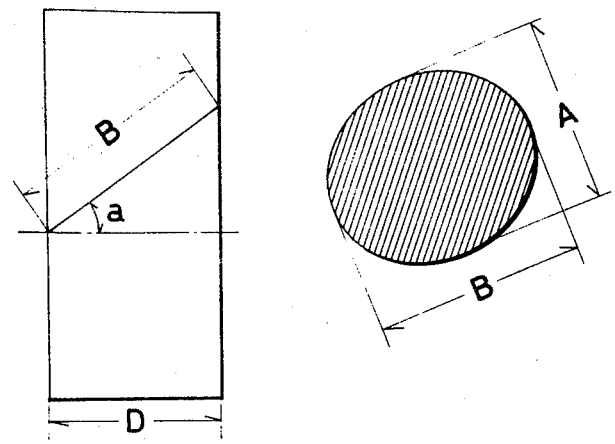
FIG. 1 is an explanatory diagram to show the principle of the present invention.

In cases where the major and minor axises of a required oval product are fixed, it is possible to obtain an oval section conforming to the required oval product by means of, as shown in FIG. 1, cutting a cylindrical body, which has a diameter D corresponding to the minor axis A, obliquely in such way as the length of such oblique cut agrees with the length of the major axis B.

In this case, an angle($a$) between the said section and a horizontal level is expressed as follows.

$$\cos a = \frac{D}{B} = \frac{A}{B}$$

Thus, a required value of the angle($a$) can be calculated easily.

Guiding of a tool in the tracing equipment, that is to say a tracing mechanism, is carried out along a surface (usually a horizontal level) which falls at right angles with the axial line of the rotative main shaft. Therefore, if said cylindrical body is fixed obliquely at an angle $a$ against the horizontal level, its surface to be traced becomes an oval circumference having the required major and minor axises.

As has been described in the foregoing paragraphs, the present invention aims at cutting out said master cam directly by tract cutting on the basis of the circumference of an oblique section of a cylindrical body.

Now, an explanation of an embodiment of the present invention with reference to attached drawings.

Figure 2:
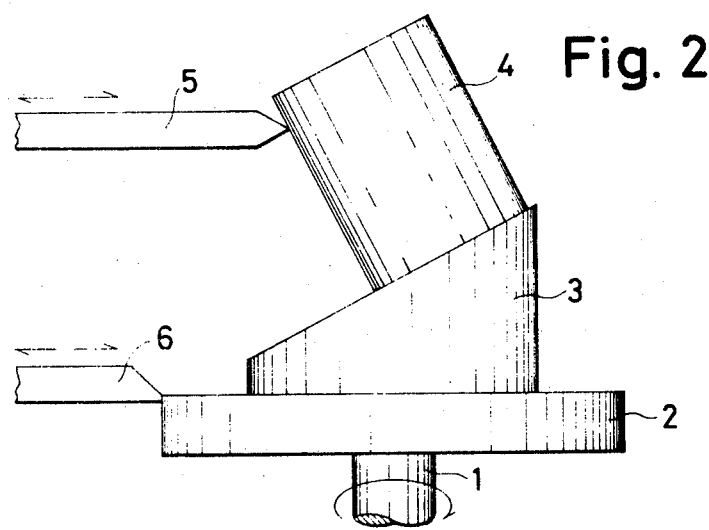
FIG. 2 is an explanatory diagram to show an example of the equipment in accordance with the present invention.

In FIG. 2, a main shaft 1 is fixed onto a base and rotates while standing upright; a cam 2 is fixed with a master, an inclined stand 3 and a cylindrical body 4 is fixed to said inclined stand 3. These elements are assembled with screws and are turned together in accordance with the rotation of the main shaft 1. A movable feeler 5 which is fixed on the base and its pointed head comes in contact with the circumference of the cylindrical body 4. The feeler 5 is always pressed horizontally toward the cylindrical body 4 by a spring or oil pressure. A cutting tool 6 slides horizontally while linked with the movable feeler 5 and comes down little by little and cuts the circumference of the material 2.

In this case, as already stated, it is necessary that the cylindrical body 4 be fixed at such an inclined angle so that the section which is obtained by cutting the cylindrical body by the plane which crosses at right angles to the main shaft 1 i.e. a horizontal level, will form an oval shape similar to that of the required oval product in the same or enlarged or reduced size, and it is further necessary that the center of the oval section at the point where the pointed head of the movable feeler 5 touches agrees with the axial line of the main shaft 1. Therefore, it is a matter of importance that the inclination degree of the upper surface of the inclined stand 3 and the position of fixing screws which are screwed onto the lower surface of the cylindrical body 4 are respectively decided accurately.

Now, in the equipment as shown in FIG. 2, the material 2 to produce the master cam is far larger in size than the obliquely cut section of the cylindrical body 4 and the distance of movement of the cutting tool 6 is equal to that of the movable feeler 5. Thereby, the master cam to be produced has the minor axis being larger than that of the oval i.e. the obliquely cut section of the cylindrical body 4, but its major axis is only as large as the total of said minor axis and a difference between the major and minor axises of the oval section of the cylindrical body 4. Accordingly, the master cam has an oval shape which is nearly a perfect circle.

Figure 3:
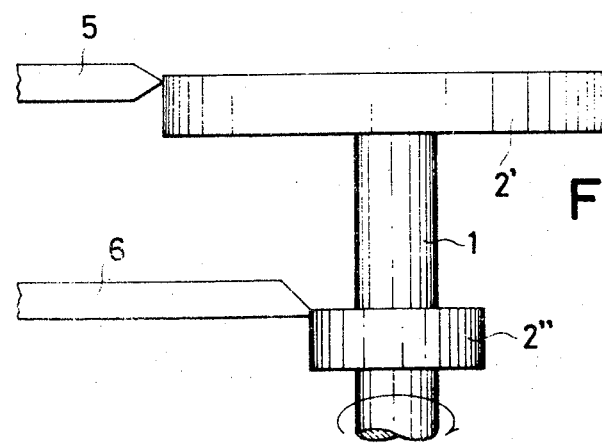
FIG. 3 is an explanatory diagram to show the state in which an oval product is produced from a master cam.

But, this does not matter at all. Because, as shown in FIG. 3, when putting the master cam 2' thus obtained in place of the cylindrical body 4 in the same cutting equipment and also putting an oval product material 2" in place of the master cam material 2 and then producing an oval product having the same minor axis as that of the cylindrical body 4 by the cutting tool 6 which links with the movable feeler 5 touching the circumference of the master cam 2' and which moves the same distance as the movable feeler 5 moves, the major and minor axises of the oval product 2' are respectively equal to those of the cylindrical body 4. Here, a separate cutting equipment may be used for this purpose.

Further, when the cylindrical body 4 has the minor axis being larger than that of the required oval product, the cutting process may be done only by reducing the distance of movement of the cutting tool that much against the distance of movement of the movable feeler 5. This operation is similar to the case of an ordinary tracing lathe.

In the aforementioned embodiment, the cylindrical body 4 is a right cylinder and is fixed on the inclined stand 3 to maintain a prescribed inclination. But, the inclined stand 3 is not always necessary. The important thing is that the cylindrical body 4 keeps a prescribed inclination and a prescribed position.

For this purpose, it may be considered to cut the bottom of the cylindrical body 4 obliquely and fix it directly onto the main shaft 1 or to bend the upper part of the cylindrical body 4 to one side in order to let that part incline.

Further, in order to let the center of the section of the cylindrical body 4 agree with the center of the main shaft 1, the movable feeler 5 must always be held horizontally while its pointed head may move up and down slightly. This can be done easily by turning the main shaft 1 and adjusting the degree of swinging of the pointed head by a dial gauge.

As has been described in the foregoing paragraphs, the present invention has made it possible to cut out a master cam, which has hitherto been considered difficult to finish into a precise oval, quite easily from an inclined cylindrical body. That is to say, it has become possible to obtain an oval shape having required major and minor axises by means of holding the cylindrical body at an inclination angle which has been calculated beforehand. Thus, the present invention has very wide application.

What we claim is:

1. A method of cutting an object having an oval circumference comprising the steps of:

fixing a cylindrical body to one end of a rotatable main shaft at a prescribed angle to the shaft such that a plane cutting through the inclined cylindrical body at right angles to the axis of the main shaft will define the oval shape of the desired oval product;

biasing a tracing apparatus against the circumference of the cylindrical body at the circumference of the body where said plane at right angles to the axis of the shaft defines the desired oval circumference at the position where the center of the defined oval corresponds to the axis of said main shaft;

cutting a master cam from material fixed onto the main shaft using said tracing apparatus connected to a cutting means whereby the master cam cut from the material by said cutting means corresponds to the oval circumference of the inclined cylindrical body traced by said tracing apparatus; and cutting the desired oval object from material fixed to the main shaft using said tracing apparatus connected to said cutting means to trace around the circumference of said master cam, thereby cutting the desired oval shape similar to the oval circumference of the inclined cylindrical body originally traced by the tracing apparatus to form said master cam.

* * * * *